3,775,308
METHOD FOR PREPARATION OF COMPOSITE SEMIPERMEABLE MEMBRANE

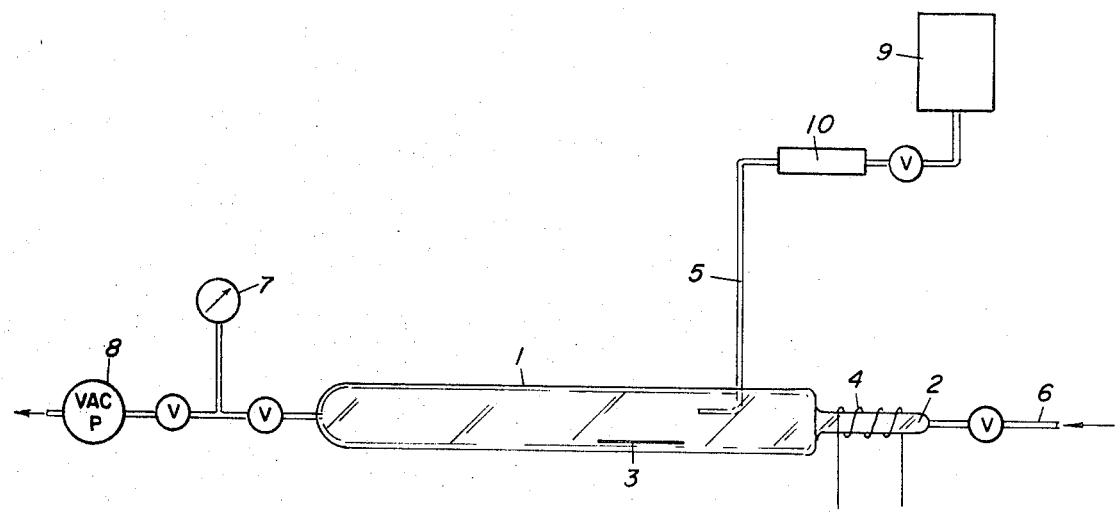

Hirotsugu Yasuda, Durham, N.C., assignor to the United States of America as represented by the Secretary of the Interior
Filed May 18, 1972, Ser. No. 254,518
Int. Cl. B01d 13/00; B01k 1/00
U.S. Cl. 210—23                                    8 Claims

ABSTRACT OF THE DISCLOSURE

A semipermeable composite membrane is formed by electrodeless glow discharge polymerization of an organic monomer in the presence of a porous support, the polymerization resulting in deposition of a thin film of polymer on the surface of the support.

---

Reverse osmosis has attracted considerable interest in the field of purification of saline water. In this process, a pressure in excess of the osmotic pressure of the saline water feed solution is applied to the solution separated from purified water by a semipermeable membrane. Pure water is thereby caused to diffuse through the membrane, while the salt molecules or other impurities are retained by the membrane.

Efficiency of the reverse osmosis process depends to a large extent on the nature of the membrane and numerous types of membranes and methods of preparing them have been described in the prior art, e.g., in U.S. Pats. 3,133,132; 3,344,214; 3,412,184; 3,439,074; 3,472,766; 3,497,451; 3,551,331 and 3,567,632. These membranes are commonly cast from a solution comprising the membrane material and an organic solvent, with or without additional solution components such as water, swelling agents, etc. The membranes may be employed in the reverse osmosis process in the form of a free film or a film deposited on a porous support material. Composite membranes comprising a porous support and an ultrathin film intimately bonded to the surface of the support have recently been developed for use in reverse osmosis processes for desalination of sea water or brackish water. These composite membranes have been prepared by a variety of processes including casting on porous substrates, dynamically forming coatings on porous substrates and in situ formation of membranes.

Another process for preparing composite membranes is disclosed by K. R. Buck and V. K. Daver in Brit. Polym. J., 1970, 2 (5), 238–9. In this process, glow discharge, obtained by means of electrodes and using low frequency (40 kHz.) R.F., was employed for polymerization of a monomer, thereby depositing polymer onto the surface of a porous support that was fixed tightly on a surface of an electrode. In this process, however, the size and shape of membranes that can be prepared are limited by that of the electrode. Furthermore, the reverse osmosis properties, i.e., salt rejection and flux properties, of such membranes, as well as other prior art membranes, leave much to be desired.

It has now been found, according to the process of the invention, that a composite membrane characterized by high chemical stability and mechanical strength, as well as desirable reverse osmosis characteristics, may be prepared by electrodeless glow discharge polymerization of an organic monomer in the presence of a porous support. Polymerization is achieved by subjecting the monomer, in vapor form, to the influence of electromagnetic energy, such as radio frequency or microwave energy, of a frequency and power sufficient to cause an electrodeless glow discharge in the monomer vapor. The growing polymer species deposit onto the surface of the porous support due to the decrease of vapor pressure of the growing polymer molecules. This deposition of growing species results in formation of a highly cross-linked film on the surface of the support, the thickness of which is nearly linearly dependent on the polymerization rate and reaction time and will usually range from about 300 A. to about 2,000 A.

The state of the monomer vapor at which polymerization occurs is that of a low temperature plasma consisting of various species of ionized and excited gases and vapors. One of the characteristic features of such a plasma is its liquid-like property, which enables deposition of polymer on surfaces of any shape. The porous support may, therefore, be in various forms, e.g., sheet, tubular membrane, or hollow fibers.

Polymerization can be initiated by a plasma formed from essentially pure monmer, or the plasma may be formed from a mixture of the monomer and a plasma gas such as helium, hydrogen, nitrogen, argon or neon. Where a mixture is employed, the monomer will usually comprise about 20 to 95 volume percent of the gaseous mixture.

The support is preferably as porous as possible consistent with its primary function of supporting the polymer film in an environment where sizeable pressure differentials will exist. Generally, the support should not contain surface pores greater in diameter than the thickness of the polymer film. Pore size will generally range from about 50 to 5000 A. Void volume, i.e., the percentage of unoccupied space within a unit volume of the support, will generally range from about 40 to 80 percent. Suitable support materials include porous glass, sintered metals, ceramics, etc.

Preferred support materials are, however, organic polymeric materials such as homopolymers or mixed polymers of cellulose acetate, polysulfone, cellulose butyrate, cellulose nitrate, styrene, vinyl butyral, etc. Such support materials are conventional in the reverse osmosis art and are readily prepared by casting from a solution comprising a good solvent for the polymeric material, plus a poor or nonsolvent therefor. For example, if the polymeric material comprises a mixture of cellulose acetate and cellulose nitrate it may be dissolved in acetone in an amount of about 14 wt. percent, and about 50 wt. percent of a poor solvent such as water, glycerin, ethyl or butyl alcohol or mixtures thereof, is then added to this solution. A layer of the desired thickness is then cast from the combined mixture, as by coating a glass plate having side runners. The cast cellulose acetate-cellulose nitrate layer is then allowed to dry, preferably under conditions which retain the nonsolvent within the cast layer while the initial evaporation of the good solvent is accomplished. For example, if the nonsolvent is water the drying is carried out in a high humidity atmosphere. For this purpose the good solvent should have a higher vapor pressure than the nonsolvent so that its evaporation will take place first.

When support materials in the form of porous glass, sintered metals or ceramics are employed they may be used in thicknesses in the neighborhood of 100 to 1000 microns. When polymeric organic materials are employed they are generally employed in the range of 10 to 150 microns in thickness, with membrane constants of about 10 to 10,000×10$^{-5}$ g./cm.$^2$-sec.-atm. Although the thickness may of course vary depending primarily upon the structural characteristics of the particular polymeric material, such a material is often used having a thickness between about 30 to 60 microns. There are also suitable commercially available substances that may be used as the porous support substrate. For example, porous polymeric substances such as millipore filters may be employed, particularly those having a mean pore size of about 250 A. These millipore filters are made from a mixture of cellulose acetate and cellulose nitrate.

The organic monomer may be any organic compound capable of vapor phase polymerization initiated by application of radio frequency or microwave electromagnetic energy. Generally, however, compounds having melting points below about 30° C. and boiling points below about 230° C. are preferred since these can usually be readily provided in vapor form from a liquid source. 4-vinylpyridine has been found to give particularly good results; however, other monomers such as 2-vinylpyridine, 5-vinyl-2-methylpyridine, N-vinylpyrrolidone, 2-picoline, 3-picoline, 4-picoline, 4-ethylpyridine, 2,5-lutidine, 3,5-lutidine, 5-ethyl-2-methylpyridine, 4-tertiarybutylpyridine, n-butylamine, sec-butylamine, 4-methyl-benzylamine, pyrrole and pyrrolidine may also be used.

The polymerization reaction is carried out under a reduced pressure of about 0.01 to 1 mm. of Hg. Ambient temperatures are usually employed, but the temperature may range from about −20 to 100° C. Optimum pressures, temperatures and amounts of monomer may vary considerably depending on the nature of the porous support, monomer used, desired thickness of the polymer film, etc., and are best determined experimentally. The polymerization may be carried out in any conventional reaction vessel, such as glass tube, designed to provide for introduction of monomer vapor and plasma gas, maintenance of suitable pressures and exposure to the source of electromagnetic energy.

Polymer deposition onto the porous substrate, in the process of the invention, may be accomplished by means of various methods, discussed below. The optimum method will depend on a variety of factors such as (1) vapor pressure of the monomer, (2) characteristic polymerization rate of the monomer in a glow discharge, (3) pressure change of the monomer in glow discharge, (4) plasma susceptibility of the porous substrate, (5) breakdown wattage necessary to initiate glow discharge of the monomer and (6) sorption characteristics of the porous substrate, and is best determined experimentally. Possible methods of polymer deposition within the scope of the invention include the following:

Method I. Flow system.—Monomer is continuously fed into the reaction vessel, with unreacted monomer being removed via suitable means.

Method II. Closed system with sorption of monomer by the porous substrate.—Monomer is fed into a closed system at constant flow rate until the pressure of the system reaches a predetermined level. No monomer feed-in occurs during glow discharge.

Method III. Closed system without sorption of monomer by porous substrate.—Monomer vapor is initially stored in a reservoir without exposure to substrate. As soon as monomer vapor is introduced from the reservoir into the reaction vessel, glow discharge is initiated.

Method IV. Semi-closed system with sorption of monomer by substrate.—Similar to Method II except that monomer vapor is continuously fed into a closed system from a liquid monomer source during glow discharge.

Method V. Semi-closed system without sorption of monomer by substrate.—Monomer vapor is allowed to build up in a reservoir from a liquid monomer source without exposure to the substrate. As soon as monomer vapor is introduced into the reaction vessel, glow discharge is initiated. Monomer vapor is then continuously fed into a closed system during glow discharge.

Method VI. Semi-closed system connected to a monomer flow.—Similar to Method V, except that as soon as glow discharge is initiated the system is connected to a pump. This method is used when the pressure in the reaction vessel rises due to decomposition of either the monomer or the substrate.

Method VII. Semi-closed system connected to pump.— Similar to Method II, except that as soon as glow discharge is initiated the system is connected to a pump.

The electromagnetic energy employed in the process of the invention is of a frequency and power to generate an electrodeless glow discharge in the gaseous reaction medium, thus resulting in the formation of the plasma. Suitable frequencies are in the radio or microwave range and may be from about 100 kHz. to 3,000 mHz., with a range of about 1 to 1,000 mHz. being preferred. Power output of the applied electromagnetic energy source may vary from about 1 to 1,000 watts, with about 10 to 100 watts being preferred. Generally, the wattage employed will be the lowest power that will maintain a full glow discharge in the entire reaction vessel, whereby the deposition is carried out in the glow region. It has been found that such a procedure is distinctly superior to deposition in the non-glow discharge region, the amount of polymer deposition being small and erratic in the latter. Polymerization times will vary with the desired thickness of the polymer film, as well as the other above-discussed variables, but a reaction time of about 1 to 60 minutes is usually suitable.

Although the exact mechanism involved in the glow discharge polymerization process of the invention is not known with certainty, it seems probable that the polymerization proceeds via a unique polymerization mechanism of ionized molecules that is distinct from conventional addition polymerization. In this type of polymerization the double bonds of vinyl compounds do not play the major role in polymer deposition and many organic compounds that do not contain olefinic double bonds may be readily polymerized in the process of the invention. The mechanism of the polymerization process of the invention also differs from that involved in polymer deposition onto an electrode, as employed by Buck and Davar, ibid. In the latter, the adsorption of monomer on the porous support plays an important role, whereas in the process of the invention polymerization in plasma (vapor phase) plays the major role. As a result, optimum results require the use of higher frequency where an electrodeless glow discharge is employed, as in the present invention.

The desalination devices in which the composite membranes of the invention are typically employed are conventional and will not be described in detail in this application. In general, however, such devices include mounting means for positioning the membrane so that a supply of feed solution at the desired pressure can be fed to the surface of the membrane on which the polymer film is located. The devices also include systems for removing the fluid which permeates through the opposite surface of the composite and a system for removing the feed mixture which has been depleted to the fluid component. The flow rate of the feed mixture to the device and withdrawal of the depleted mixture are regulated to maintain the desired feed pressure while keeping the boundary layer effect at the surface of the membrane below the desired limit.

Composite membranes prepared by the process of the invention generally exhibit unique features that make them outstanding for reverse osmosis applications. These include: (1) increase in salt rejection and water flux with time of the reverse osmosis run, (2) stable water flux after an initial incline is established, practically no flux decline being observed in many instances, and (3) excellent performance at high salt concentration and under high pressure. This is in contrast to the behavior of most conventional reverse osmosis membranes which exhibit a decline in flux with time due to compaction of the membrane, and trend that is generally more pronounced with high salt concentration and under high pressure.

Although the membranes of the invention find particular utility in reverse osmosis desalination processes, their applications also include various other membrane processes such as gas separation, water pollution control and biomedical applications such as blood oxygenator and hemodialysis membranes.

The following examples will serve to more particularly illustrate the invention. The apparatus used in these examples is illustrated diagrammatically in the figure. The polymerization vessel consisted of a glass tube having a section 1 of 40 mm. I.D. and 300 mm. length which tapered to a 20 mm. I.D., 350 mm. long, section 2. Polymerization and deposition of the polymer on the porous support 3 took place in section 1, while section 2 was inserted into the coil 4 through which radio-frequency voltage was applied. The polymerization vessel was fitted via ground glass connections (not shown in figure) to monomer inlet 5, plasma gas inlet 6, a differential pressure transducer 7 and a vacuum pump 8. The monomer was placed in reservoir 9 and supplied via flowmeter 10 to the polymerization vessel.

The power supply (not shown in figure) was a radio-frequency transmitter, the output of which was fed into a linear amplifier having a 500 watt capacity. The amplifier output was coupled to coil 4 through a network of tuneable capacitors. An in-line power coupler (not shown in figure) was used to measure the R.F. power.

EXAMPLE 1

In this example, 4-vinylpyridine was polymerized by means of a radio frequency of 13.56 mHz. The porous support consisted of 0.025 $\mu$pore size millipore filter, type VSWP, having the dimensions 90 mm. diameter and a thickness of 140 micron. This support was placed in the polymerization vessel with the top side of the filter toward the inside of the tube and with the opposite side fitted tightly against the glass wall of the polymerization vessel.

The polymerization vessel was evacuated to a vacuum of less than $1\mu$ Hg and the support was degassed for a period of 10 minutes at this vacuum. The monomer, 4-vinylpyridine, which was previously degassed, was introduced into the vessel up to $200\mu$ Hg and polymerized at a discharge wattage of 30 watts for approximately 8 minutes.

The resulting composite membrane, consisting of the porous support coated with a thin layer (about $0.05\mu$ in thickness) of the polymer, was then tested in a reverse osmosis apparatus consisting of four high-flow cells in a test loop pressurized by a 5.1 g.p.m. capacity pump. The gap between membrane surface and the top surface of the cells was adjusted to 1 mm. to insure a sufficient flow rate of feed solution at the membrane surface.

The membrane was found to give 99.9 percent salt rejection with a water flux of 30 gfd during a two week test period with a feed of 1.2 percent NaCl and a pressure of 1200 p.s.i.

EXAMPLE 2

Using the apparatus described above, a membrane was prepared from 4-picoline on porous polysulfone substrate. The polysulfone was prepared by coagulation in water of the cast polysulfone in DMF solution, and had a pore size comparable to that of the millipore of Example 1. The substrate was mounted and degassed as in Example 1. The 4-picoline vapor was then admitted to a pressure of $540\mu$ Hg. The sample was polymerized at 30 watts for 8 minutes. In reverse osmosis testing this sample gave 98% salt rejection at a flux of 6.4 gfd. Changing the run conditions of 1.2% NaCl at 1200 p.s.i. to 3.5% NaCl at 1500 p.s.i. did not substantially alter the results.

EXAMPLE 3

Using the apparatus described above, a membrane was prepared from 3,5-lutidine on a porous glass tube which had a pore size of 50 A. The porous glass tube was mounted in the center of the reaction chamber by sliding onto a smaller tube extending from the monomer inlet. The monomer was then admitted from a 4-liter reservoir containing $1700\mu$ Hg monomer vapor and the plasma was immediately initiated. The sample was polymerized at 150 watts for 5 minutes. In reverse osmosis testing with 3.5% NaCl at 1500 p.s.i. this sample gave 99% rejection at a flux of .40 gfd (approximately 70% of water flux for nontreated porous glass tube).

EXAMPLE 4

Using the apparatus described above, a membrane was prepared from N-vinylpyrrolidone on porous polysulfone substrate (prepared as described in Example 2). The substrate was mounted and degassed as in Example 1. The monomer was admitted into the pumping system to give a steady-state pressure in this flow system of $40\mu$ Hg. The plasma was immediately initiated and the polymerization of the monomer continued for 30 minutes at 30 watts. In reverse osmosis this sample gave 90% salt rejection at 11.0 gfd at 1.2% NaCl and 1200 p.s.i.

EXAMPLE 5

Using the apparatus described above, a membrane was prepared from n-butylamine on porous polysulfone substrate (prepared as described in Example 2). The substrate was mounted and degassed as in Example 1. The monomer was admitted into the closed system to a pressure of $550\mu$ Hg. The plasma was then initiated and the chamber was opened to the pump. The sample was polymerized 3 minutes at 30 watts. The monomer was then admitted to the pumping system with the plasma still on, at a rate which would give $30\mu$ Hg in the flow system. The polymerization continued for 37 minutes at 30 watts (for a total of 40 minutes at 30 watts). In reverse osmosis testing this sample gave 95% salt rejection at a flux of 3.1 gfd. Changing the run conditions of 1.2% NaCl at 1200 p.s.i. to 3.5% NaCl at 1500 p.s.i. did not substantially alter the results.

EXAMPLES 6–8

These examples also employed the apparatus described above. Membranes were prepared from porous polysulfone substrate (as described in Example 2) and the monomers are given in the following table. Reverse osmosis test conditions and results (salt rejection and flux) are also given in the table. Experimental procedure was otherwise similar to that of Example 2.

| Monomer | R. O. test condition | | SR (percent) | Flux (Gfd) | Monomer pressure, $\mu$ | Polymerization | |
|---|---|---|---|---|---|---|---|
| | NaCl | P.s.i. | | | | Wattage, W. | Time, min. |
| 4-ethylpyridine | 1.2% | 1,200 | 98 | 10.0 | 520 | 30 | 7 |
| 4-picoline | 3.5% | 1,500 | 98 | 5.4 | 540 | 30 | 7 |
| 3,5-lutidine | 3.5% | 1,500 | 99 | 12.0 | 610 | 30 | 8 |

I claim:

1. A process for preparation of a composite semipermeable membrane comprising (1) positioning a porous support in an atmosphere comprising a polymerizable organic monomer in vapor form, said monomer being from the group consisting of 4-vinylpyridine, 4-ethylpyridine, 4-picoline, 3,5-lutidine, N-vinylpyrrolidone and n-butylamine, and (2) subjecting said monomer to the influence of electromagnetic energy of a frequency of about 100 kHz. to 3000 mHz. to effect an electrodeless glow discharge, thereby causing polymerization of the monomer and deposition of the resulting polymer as a film on the surface of the support.

2. The process of claim 1 in which the electromagnetic energy has a frequency in the range of about 1 to 1,000 mHz.

3. The process of claim 1 in which the porous support is characterized by a pore size of about 50 to 5000 A. and a void volume of about 40 to 80 percent.

4. The process of claim 1 in which the porous support consists of an organic polymeric material.

5. The process of claim 4 in which the organic polymeric material is a mixed polymer of cellulose acetate and cellulose nitrate.

6. The process of claim 4 in which the organic polymeric material is polysulfone.

7. The process of claim 1 in which the porous support consists of a porous glass tube.

8. In a process for desalination of saline water by reverse osmosis comprising contacting the saline water under pressure with a reverse osmosis membrane, the improvement comprising using a composite membrane prepared by the process of claim 1 as the reverse osmosis membrane.

References Cited

UNITED STATES PATENTS

| | | | |
|---|---|---|---|
| 3,049,488 | 8/1962 | Jackson et al. | 204—168 |
| 3,457,170 | 7/1969 | Havens | 210—321 X |
| 3,432,413 | 3/1969 | Vanderhoff | 204—168 X |
| 2,364,790 | 12/1944 | Hemming | 204—168 X |
| 2,676,145 | 4/1954 | Weisz et al. | 204—169 |

OTHER REFERENCES

Buck et al., Application of Glow Discharge Polymerization to the Preparation of Reverse Osmosis Membranes, pp. 238–39, 1970.

Goodman, The Formation of Thin Polymer Film in the Gas Discharge, Journal of Polymer Science, vol. XLIV, 1960, pp. 551–52.

Reverse Osmosis for Water Desalination, R&D Progress Report No. 208, Office of Saline Water, p. 185, September 1966.

Polymerization by Glow Discharge, Williams et al., from Nature, Feb. 19, 1966, pp. 769–73.

SAMIH N. ZAHARNA, Primary Examiner

R. BARNES, Assistant Examiner

U.S. Cl. X.R.

204—165, 296; 210—500